United States Patent
Crowther et al.

(10) Patent No.: US 10,084,740 B2
(45) Date of Patent: Sep. 25, 2018

(54) PROCESSING MESSAGES FOR RETRIEVAL FROM A MESSAGE QUEUING SYSTEM

(71) Applicant: INTERNATIONAL BUSINESS MACHINES CORPORATION, Armonk, NY (US)

(72) Inventors: Fiona M. Crowther, Manchester (GB); Geza Geleji, Hursley (GB); Christopher J. Poole, Hursley (GB); Martin A. Ross, Hursley (GB); Craig H. Stirling, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 14/867,300

(22) Filed: Sep. 28, 2015

(65) Prior Publication Data

US 2016/0099902 A1  Apr. 7, 2016

(30) Foreign Application Priority Data

Oct. 2, 2014 (GB) .................................. 1417430.4

(51) Int. Cl.
G06F 15/16 (2006.01)
H04L 12/58 (2006.01)
H04L 29/08 (2006.01)

(52) U.S. Cl.
CPC .............. *H04L 51/26* (2013.01); *H04L 67/32* (2013.01)

(58) Field of Classification Search
CPC .................................. H04L 51/26; H04L 67/32
(Continued)

(56) References Cited

U.S. PATENT DOCUMENTS 6,018,766 A 1/2000 Samuel et al.
7,240,097 B2 7/2007 Holdsworth et al.
(Continued)

FOREIGN PATENT DOCUMENTS

CN 103297395 A 9/2013

OTHER PUBLICATIONS

Aguilera et al., "Efficient Atomic Broadcast Using Deterministic Merge", Proceedings of the 19th ACM PODC (2000) (10 pages).
(Continued)

*Primary Examiner* — Alan S Chou
(74) *Attorney, Agent, or Firm* — Richard A. Wilhelm, Esq.; Kevin P. Radigan, Esq.; Heslin Rothenberg Farley & Mesiti P.C.

(57) ABSTRACT

Methods and systems are provided for processing messages for retrieval from a message queuing system. The method may be carried out at a message sending component, and may include: receiving requests from multiple clients, where a request includes at least one required record; forming a union of requests, such that a common record of multiple requests is handled once; providing the common record with an associated reference count of requests requiring the record, and associated metadata listing the client requests in the record; sending a record response to a queuing system when processed including the reference count and the metadata listing the client requests; determining when all records in a request have been sent; and notifying a client that the request can be retrieved from the message queuing system, including a response list indicating to the client the identifier of the requested records retained at the message queuing system.

20 Claims, 7 Drawing Sheets

(58) Field of Classification Search
USPC .......................................................... 709/207
See application file for complete search history.

(56) References Cited

U.S. PATENT DOCUMENTS

| | | |
|---|---|---|
| 7,406,537 B2 | 7/2008 | Cullen |
| 8,019,816 B2 | 9/2011 | Dorai et al. |
| 2005/0262205 A1* | 11/2005 | Nikolov ............... G06Q 10/107 709/206 |
| 2006/0047666 A1* | 3/2006 | Bedi ................... G06F 17/3089 |
| 2006/0053425 A1* | 3/2006 | Berkman ................ G06F 9/546 719/313 |
| 2006/0224668 A1 | 10/2006 | Ginis |
| 2007/0038703 A1* | 2/2007 | Tendjoukian ........... H04L 69/08 709/206 |
| 2011/0295966 A1* | 12/2011 | Morris ................ H04L 67/2895 709/207 |
| 2014/0101235 A1* | 4/2014 | Smedberg ........... G06F 17/2235 709/203 |
| 2014/0215492 A1 | 7/2014 | Ross et al. |

OTHER PUBLICATIONS

King et al., "Publisher Placement Algorithms in Content-Based Publish/Subscribe", 30th IEEE International Conference on Distributed Computing Systems (ICDCS), Genoa, Itally (2010) (13 pages).

* cited by examiner

PROCESSING MESSAGES FOR RETRIEVAL FROM A MESSAGE QUEUING SYSTEM

BACKGROUND

This invention relates to the field of messaging systems. In particular, the invention relates to processing messages for retrieval from a message queuing system.

A typical message queuing system based on the publish/subscribe or point-to-point model allows the retrieval of messages through GET operations or subscriptions. In both cases, the order in which the messages are received is determined by the message queuing system. Generally, a separate GET operation is required for each individual message, so if an application wishes to receive a large number of messages at the same time, it has to cope with the overhead of the large number of requests.

Certain message queuing systems support message grouping, which allows the sending application to define an order on a set of messages, and consequently enables the receiving application to get the messages in the sender defined order. The receiver needs to submit a separate GET request for each message in the group, and cannot override the order.

The capabilities for selectively retrieving messages based on (possibly complex) application specific criteria are limited. The publish/subscribe messaging model allows subscribing applications to choose topics to subscribe to. Topics allow applications to select messages on a high level, which is not appropriate for certain applications.

BRIEF SUMMARY

In one or more aspects, provided herein is a method for processing messages for retrieval from a message queuing system. The method is carried out at a message sending component, and includes: receiving requests from multiple clients, wherein a request includes at least one required record; forming a union of requests, such that a common record of the multiple requests is handled once; providing the common record with an associated reference count of requests requiring the record and associated metadata listing the client requests in the record; sending a record response to a queuing system when processed, including the reference count and the metadata listing the client requests; determining when all records in a request have been sent; and sending notification to a client that the request can be retrieved from the message queuing system, including a response list indicating to the client the identifier of the requested records retained in the message queuing system.

In another aspect, a system for processing messages for retrieval from a message queuing system is provided. The system includes a memory, and a processor in communications with the memory, wherein the system performs a method comprising: receiving requests from multiple clients, wherein a request includes at least one required record; forming a union of requests, such that a common record of the multiple requests is handled once; providing the common record with an associated reference count of requests requiring the record and associated metadata listing the client requests in the record; sending a record response to a queuing system when processed, including the reference count and the metadata listing the client requests; determining when all records in a request have been sent; and sending notification to a client that the request can be retrieved from the message queuing system, including a response list indicating to the client the identifier of the requested records retained at the message queuing system.

In a further aspect, a computer program product for processing messages for retrieval from a message queuing system is provided. The computer program product includes a computer readable storage medium having program instructions embodied therewith, the program instructions being executable by a processor to perform a method comprising: receiving requests from multiple clients, wherein a request includes at least one required record; forming a union of requests, such that a common record of the multiple requests is handled once; providing the common record with an associated reference count of requests requiring the record and associated metadata listing the client request in the record; sending a record response to a queuing system when processed, including the reference count and the metadata listing the client requests; determining when all records in a request have been sent; and sending notification to a client that the requests can be retrieved from the message queuing system, including a response indicating to the client the identifier of the requested records retained at the message queuing system.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention are described below, by way of example only, with reference to the following drawings in which.

It will be appreciated that for simplicity and clarity of illustration, elements shown in the FIGS. have not necessarily been drawn to scale. For example, the dimensions of some of the elements may be exaggerated relative to other elements for clarity. Further, where considered appropriate, reference numbers may be repeated among the FIGS. to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

To demonstrate the purpose of the described method and system, a customer information system application server is considered that can publish records about customers to a queue or topic in response to requests coming from client applications. The server may respond to individual requests asking for a subset of records stored in its database by sending each client the exact set of records they asked for. In this case, as there may be overlaps among the records requested by the clients, some records will be sent out multiple times.

As an alternative, the server may choose to wait for a number of requests and form the union of all records being requested. Having done this, it may send out the records belonging in the union in a single group of messages and let each client know which subset of the messages contains the answer to that particular client's request. Each record is only published once, but the clients must be able to correctly select the messages containing the records they wished to see. Provided that they receive this information from the server, they can contact the queuing system with the list of messages and retrieve through their subscription or a non-destructive GET the appropriate set of records.

In one or more embodiments, the server need only send the set of records that have been requested, and the message queuing system will be responsible for distributing them to the clients in aggregate messages. The clients will first receive messages containing lists of the IDs of the messages containing the records that they requested, and they will need to request the aggregate response messages from the queuing system separately.

Figure 1:
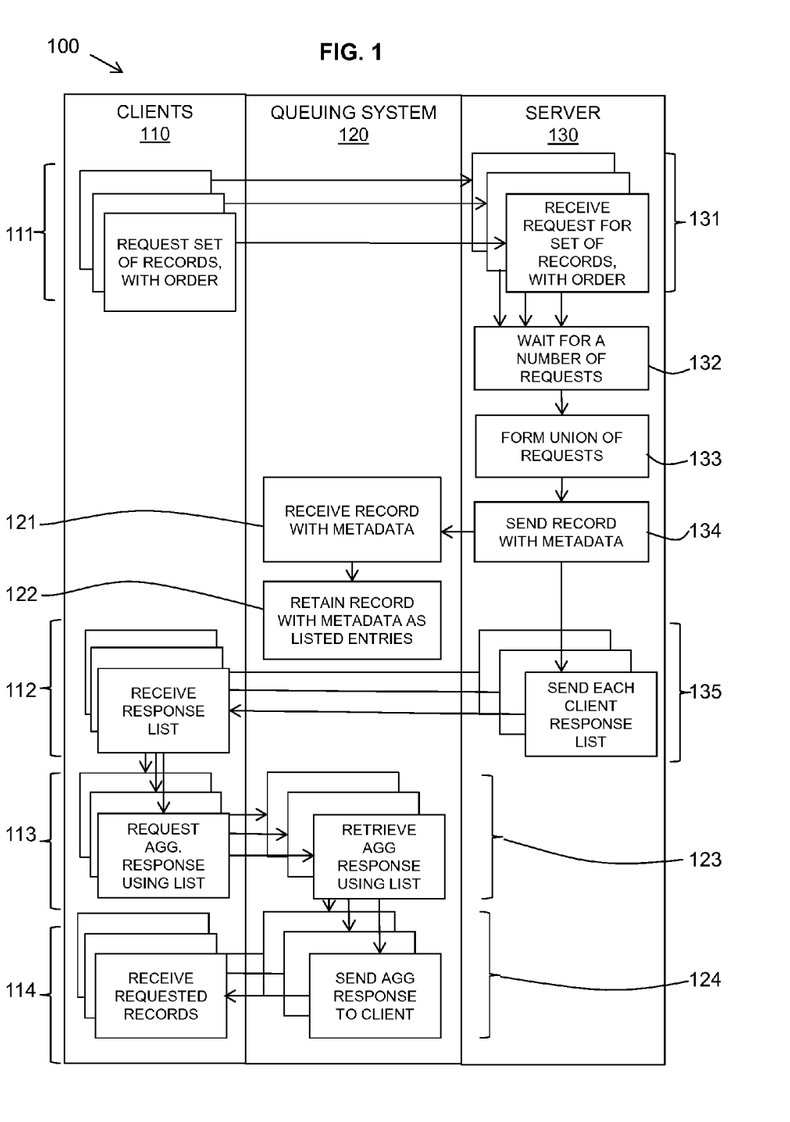
FIG. 1 is a flow diagram of one embodiment of a method, in accordance with one or more aspects of the present invention.

Referring to FIG. 1, a flow diagram 100 illustrates one embodiment of a method in accordance with one or more aspects of the present invention, as carried out between clients 110, a queuing system 120, and a server 130. Depending on the form of the messaging system, clients 110 and server 130 may be a consumer application and a publishing application, or a receiver component and a sending component, etc.

Multiple clients 110 may each send a request 111 to server 130 via queuing system 120, wherein a request 111 includes a set of records requested by the client 110, which may be requested in a given order.

Server 130 may receive 131 multiple requests, and may wait 132 for a number of incoming requests. The time server 130 waits for incoming requests may be a configurable parameter. A sliding window approach may be used to ensure continuity of processing and minimize latency.

Server 130 may form a union 133 of requests, and may group common records in the requests. Further details of such a process are given in FIGS. 2A and 2B.

Server 130 may send 134 a record together with metadata recording the number of clients (reference count) that have requested the record (and possibly the identity of the clients that have requested the record).

Queuing system 120 may receive 121 the record with metadata, and only needs to retain 122 a single copy of the record for a number of clients 110 that have requested it. When a client retrieves a copy, the queuing system 120 decrements the reference count for the record (and possibly removes the identity of the client from the metadata associated with the record). When the reference count reaches zero, the queuing system 120 may discard the record.

When server 130 has sent all the records in an incoming client request on server's 130 internal queue to queuing system 120, the request can be marked as completed and removed from the queue at server 130. At this point, server 130 may send 135 client 110 via queuing system 120, from which the request originated, a response list informing the client that all of the records that it has requested are available in the response queue of queuing system 120. The response list is sent via queuing system 120 so as to avoid maintaining a direct channel and also to allow the queuing system to complete related administrative tasks. Client 110 may then request the set of records directly from queuing system 110, which sends them in an aggregated message.

The response list includes a list of messages IDs. Server 130 obtains these IDs from queuing system 120 when it puts the records on the queue, and constructs a separate message (the response list) comprising, for instance, just the IDs. The response list is sent to client 110 via queuing system 120, which then knows how to find the records requested, and can submit a batch GET to queuing system 120, retrieving the messages listing in the response list in arbitrary order and/or composition (i.e., it could list IDs multiple times, for example, "ABACADA" if A is a special message that the client intends to use as a separator between messages B, C and D to form a single composite message).

Client 110 receives 112 the response list and requests 113 the aggregated response from queuing system 120. As the response list may be directly derived from the request that originated from the client, the order of records may be retained or ignored as desired.

Queuing system 120 may retrieve 123 the aggregated response from the retained records, decrementing the reference count for each record. Queuing system 120 may send 124 the aggregated response to client 110. The aggregated response may include the records in a required order, for instance, as given in the initial request.

Client 110 receives 114 a single response including the requested records.

Figure 2A:
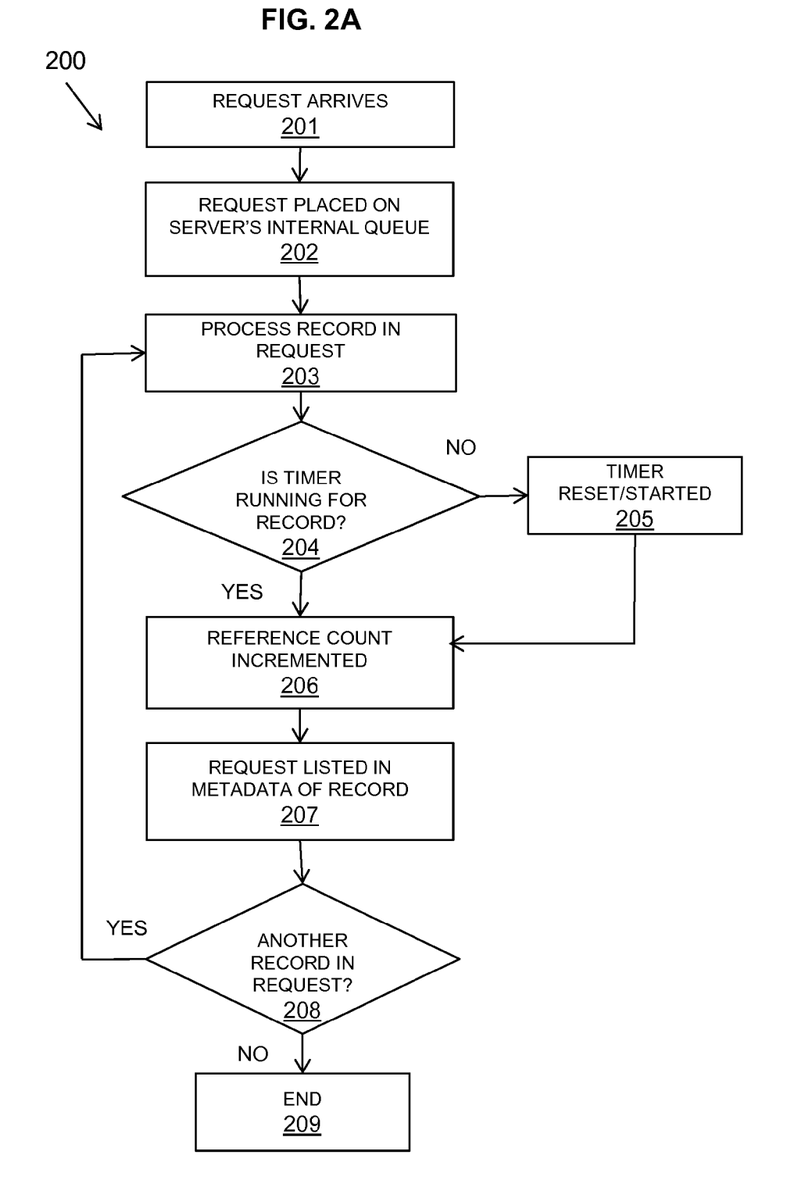
FIGS. 2A & 2B depict flow diagrams of additional aspects of one or more methods, in accordance with one or more aspects of the present invention.
Figure 2B:
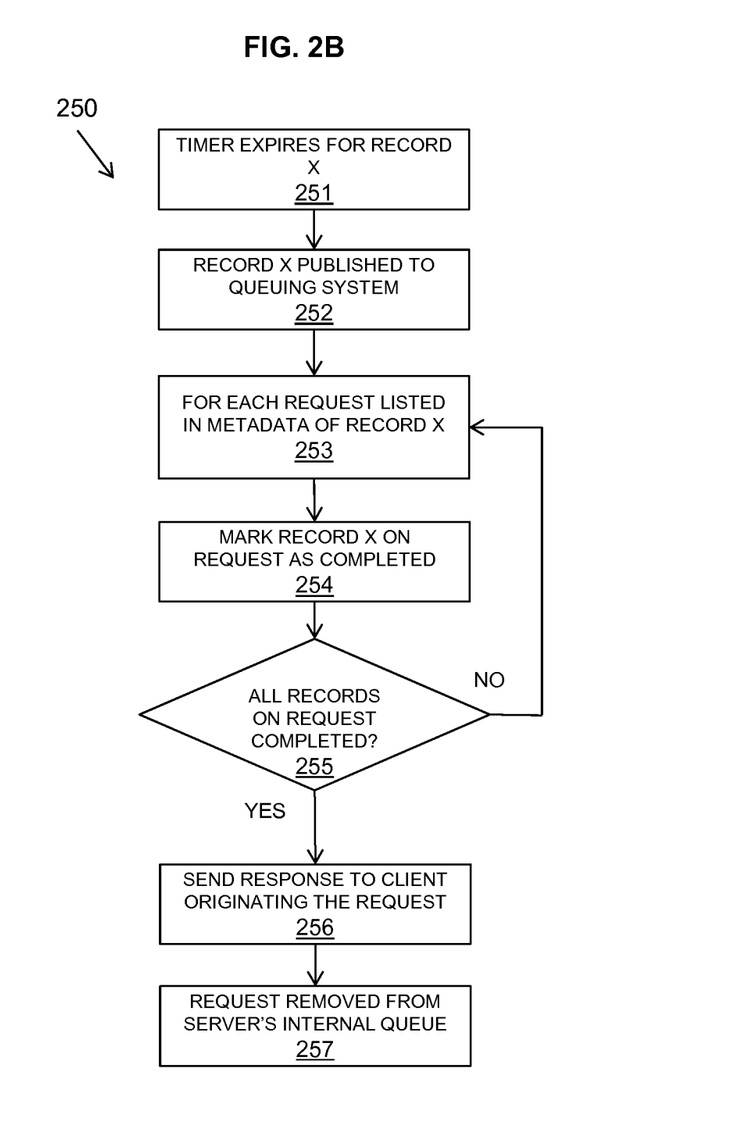

FIGS. 2A and 2B show further exemplary embodiments of processing at server 130.

Referring to FIG. 2A, a flow diagram 200 illustrates one embodiment of the processing of incoming message requests from clients 110.

A request arrives 201 from a client 110, wherein the request may include multiple records. The request is placed 202 on the server's internal first in first out (FIFO) queue.

A record in the request is processed 203 by determining 204 if a timer for the record is running. If the timer is running, processing proceeds to step 206. If a timer is not running, as it has expired or never started, the timer is reset/started 205 and then processing proceeds to step 206.

A "sliding window" approach may be used for timers started for each record. The list of records with unexpired timers constitutes the "sliding window". When a timer expires, the corresponding record is removed from the window, and the record itself is sent back to the queuing system with a list or count of the clients that have requested it while it was active. Likewise, when a new request arrives, all the records listed within the request are moved into the active sliding window, and their associated timers are started if they are not already running.

The reference count for the record is incremented 206 and the request is listed 207 in metadata of the record.

It may then be determined 208 if there is another record in the request. If so, then processing loops to step 203 and the process is carried out for the next record. If there are no further records, then the process ends 209.

Referring to FIG. 2B, a flow diagram 250 illustrates one embodiment of a process of sending records to queuing system 120 from the server 130.

A timer may expire 251 for record x. The record may be published 252 to queuing system 120 together with its metadata and reference count.

For each request listed in the metadata of record 253, the record x may be marked 254 on the request as completed. It is determined 255 if all records on a request have been completed. If they have not all been completed, then processing proceeds to the next request at step 253. If all the records on the request have been completed, then a response is sent 256 to the client 110 originating the request, and the request is removed 257 from the server's internal FIFO queue.

During processing, the server may place incoming requests on an internal queue. For each record listed in an incoming request, the server may start a timer. If a new request, that also lists the same record, arrives before the expiration of this timer, the timer is not restarted. The additional request for the record in question is noted by the server (aggregating all requests on a per-record basis). When the timer expires for a particular record, only that particular record is sent back to the queuing system. The incoming requests on the server's internal queue that have arrived before the expiration of this timer and include references to the record are marked (e.g., by removing the reference to the record). Other records are processed independently. When a new request arrives for the same record, a new timer is started, and the process is repeated. The server may only send individual records when their respective internal timers expire.

Figure 3:
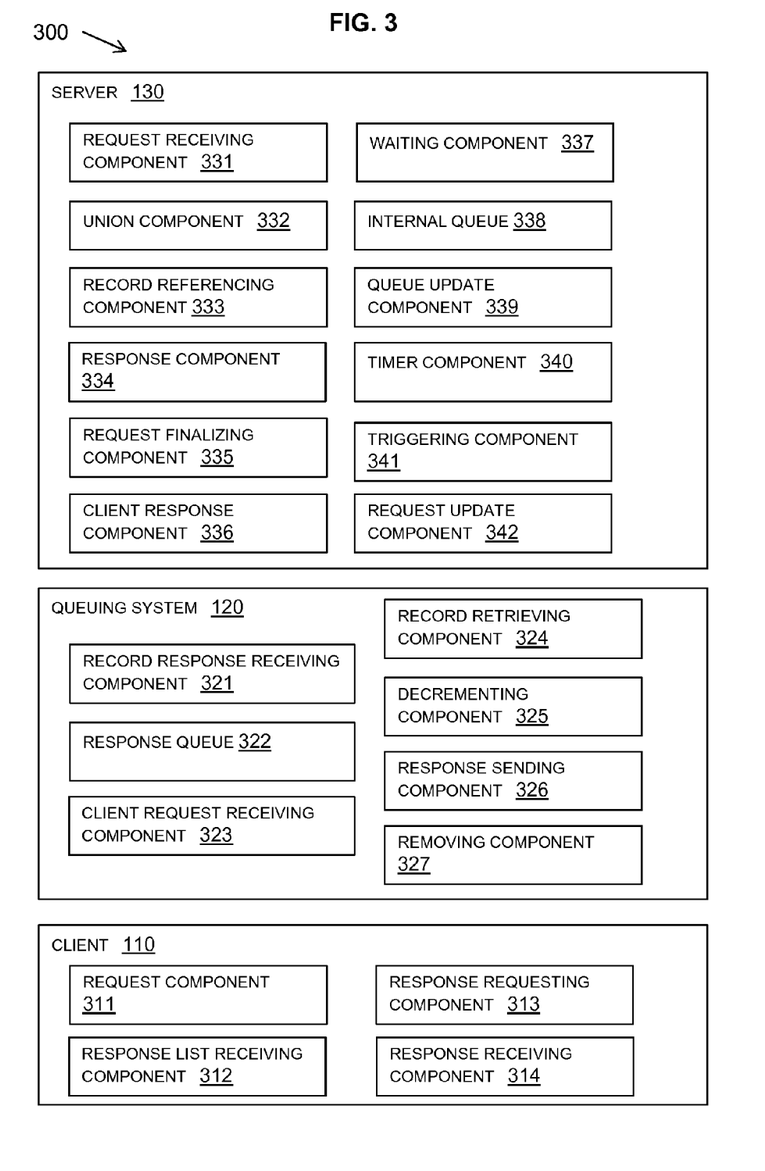
FIG. 3 is block diagram of one embodiment of a system, in accordance with one or more aspects of the present invention.

Referring to FIG. 3, an exemplary embodiment of a system 300 is shown including a server 130, a queuing system 120 and multiple clients 110. As referred to in relation to FIG. 1, server 130 may be any sending component capable of receiving requests and providing a response, and clients 110 may be any form of requesting application.

Server 130 may include a request receiving component 331 for receiving requests from multiple clients. Each request may include at least one required record, which may be requested in a required order. A union component 332 may be provided for forming a union of requests, such that a common record in multiple requests is handled once. A record referencing component 333 may be provided for referencing a common record with an associated reference count of requests requiring the record and associated metadata listing the client requests in the record. A response component 334 may be provided for sending a record response to the queuing system 120 when processed. The record response may include the reference count and the metadata listing the client requests.

Server 130 may also include a request finalizing component 335 for determining when all records in a request have been sent to queuing system 120. A client response component 336 may be provided for informing a client 110 that the request can be retrieved from message queuing system 120. The response sent to client 110 from server 130 may include a response list indicating to the client the identifier of the requested records retained at message queuing system 120.

Server 130 may include a waiting component 337 for waiting a defined period for multiple requests to be received from multiple clients in order to form a union of requests. The waiting component 337 may enable the defined period to be a configurable parameter.

Server 130 may include an internal queue 338 for storing incoming requests and a queue update component 339 for removing a request from internal queue 338 when all the records in the request have been sent.

Server 130 may also include a timer component 340 for starting a timer for each record in a request if a timer is not already running for the record and a triggering component 341 for, when a timer expires for a record, sending the record response to the queuing system 120.

Server 130 may further include a request update component 342 for, on sending a record response to a queuing system 120, marking pending requests including this record to indicate that the record has been sent.

As noted, system 300 includes queuing system 120, which may include a record response receiving component 321 for receiving a record response from server 130, including the reference count and the metadata listing the client requests. Queuing system 120 may have a response queue 322 for retaining a single copy of the record response for retrieval by multiple requesting clients 110.

Queuing system 120 may also include a client request receiving component 323 for receiving a request from a client 110 including multiple records. A record retrieving component 324 may be provided for copying the multiple record responses from the response queue 322. A decrementing component 325 may decrement the reference count for each record response and a response sending component 326 may send an aggregated response message to the client 110 including the multiple records. The queuing system 120 may also include a removing component 327 for removing a record response from a response queue when the reference count is zero.

A client 110 may include a request component 311 for sending a request for multiple records from the server. The client 110 may include a response list receiving component 312 for receiving a response list from server 130, including a reference to the identifier of the requested records at queuing system 120. A response requesting component 313 of client 110 requests the response from queuing system 120 using the response list received from server 130. A response receiving component 314 receives the response from queuing system 120, including the multiple records' responses as requested in the original request.

Figure 4:
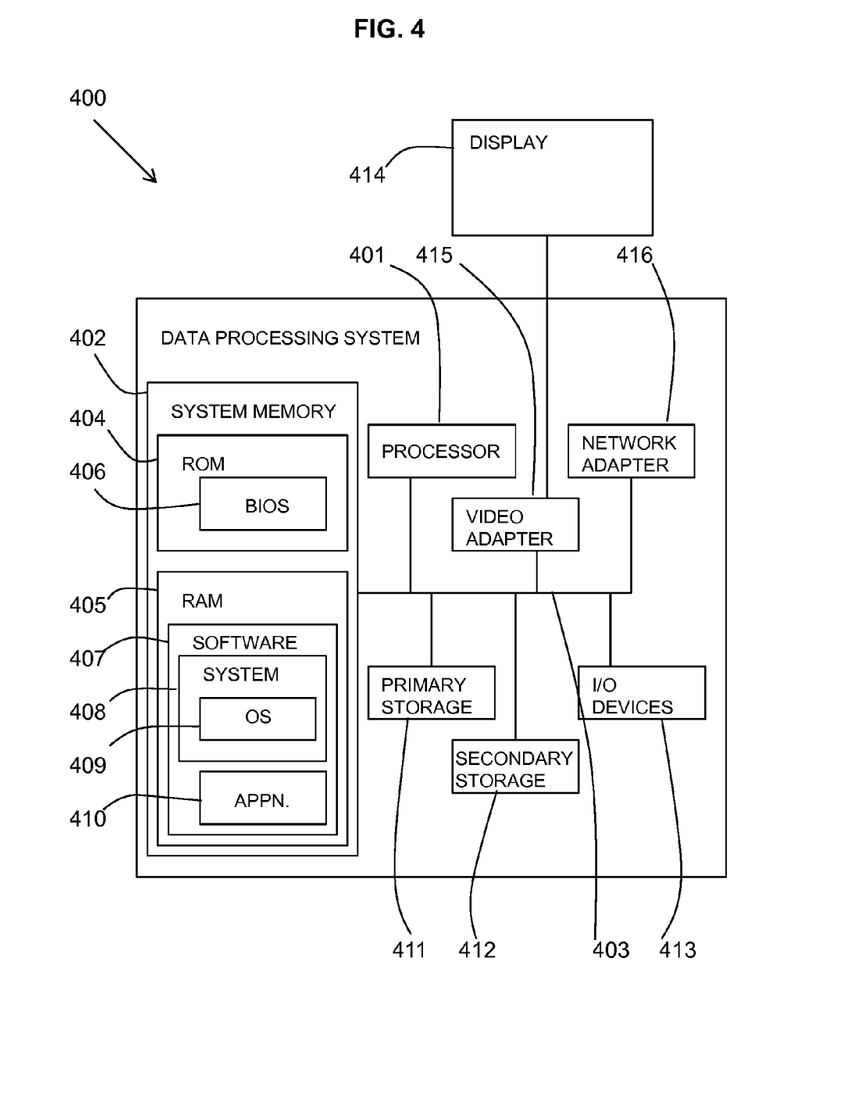
FIG. 4 is a block diagram of one embodiment of a computer system in which one or more aspects of the present invention may be implemented.

Referring to FIG. 4, an exemplary system for implementing aspects of the invention may include a data processing system 400 suitable for storing and/or executing program code including at least one processor 401 coupled directly or indirectly to memory elements through a bus system 403. The memory elements may include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. Software 407 may be stored in RAM 405, including system software 408 such as operating system software 409. Software applications 410 may also be stored in RAM 405.

System 400 may also include a primary storage means 411 such as a magnetic hard disk drive, and secondary storage means 412 such as a magnetic disc drive or an optical disc drive. The drives and their associated computer-readable media provide non-volatile storage of computer-executable instructions, data structures, program modules and other data for system 400. Software applications may be stored on the primary and secondary storage means 411, 412 as well as system memory 402.

The computing system 400 may operate in a networked environment using logical connections to one or more remote computers via a network adapter 416.

Input/output devices 413 may be coupled to the system either directly or through intervening I/O controllers. A user may enter commands and information into system 400 through input devices such as a keyboard, pointing device, or other input devices (for example, microphone, joy stick, game pad, satellite dish, scanner, or the like). Output devices may include speakers, printers, etc. A display device 414 may also be connected to system bus 403 via an interface, such as video adapter 415.

Figure 5A:
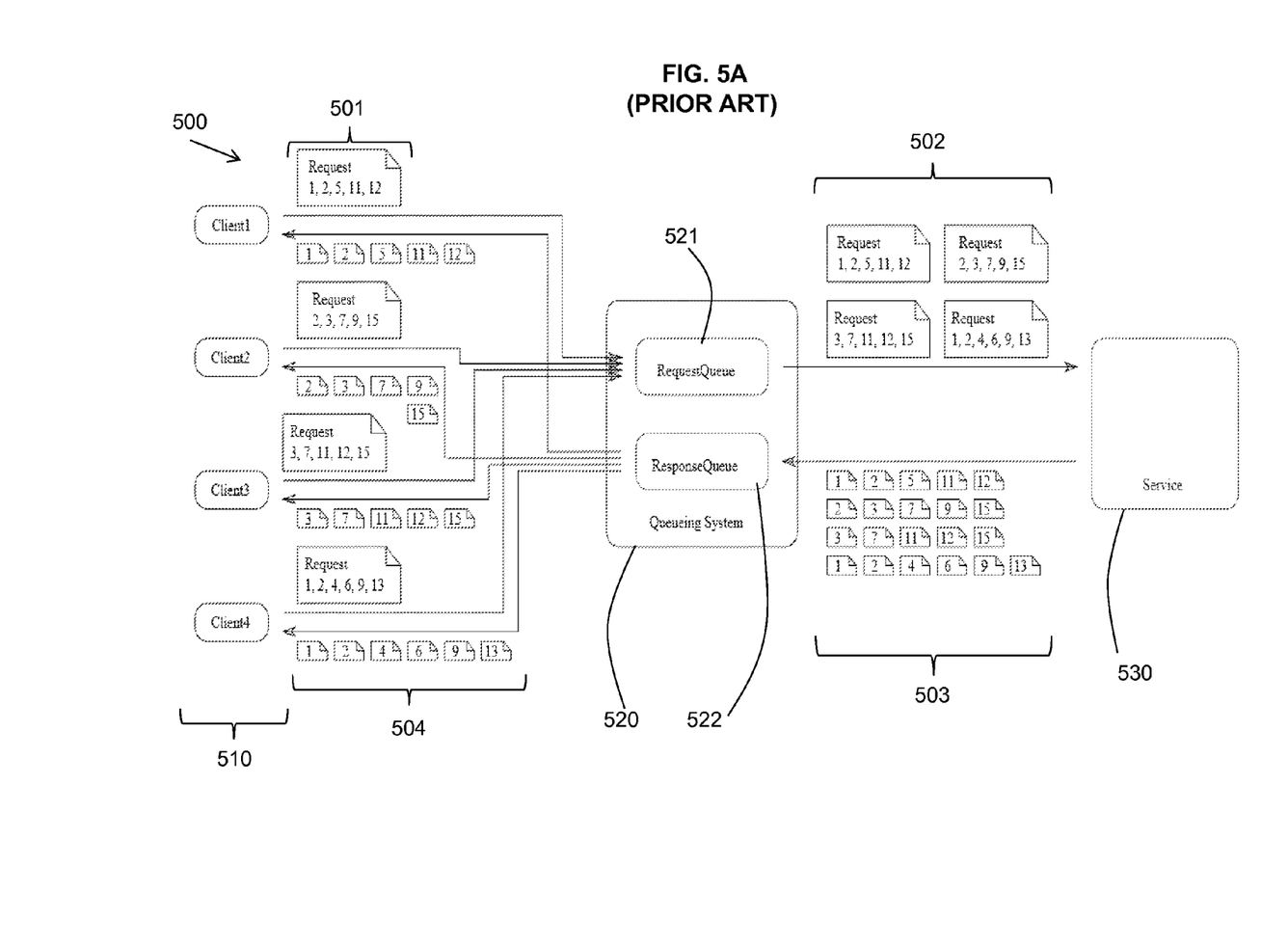
FIG. 5A is a schematic diagram showing record request processing as known in the prior art.

Referring to FIG. 5A, a schematic diagram 500 is provided showing record request processing as known in the prior art. Clients 510 may send requests 501 including multiple records. The requests 501 are sent via a request queue 521 of a queuing system 520 to a server 530 which receives the requests 502 and processes each request 502 individually resulting in the requested records 503 being obtained and sent to a response queue 522 of the queuing system 520. The requested records 503 are duplicated where the same record is requested by multiple clients 510 in their requests 501. Clients 510 receive their requested records 504 from the queuing system 520.

Figure 5B:
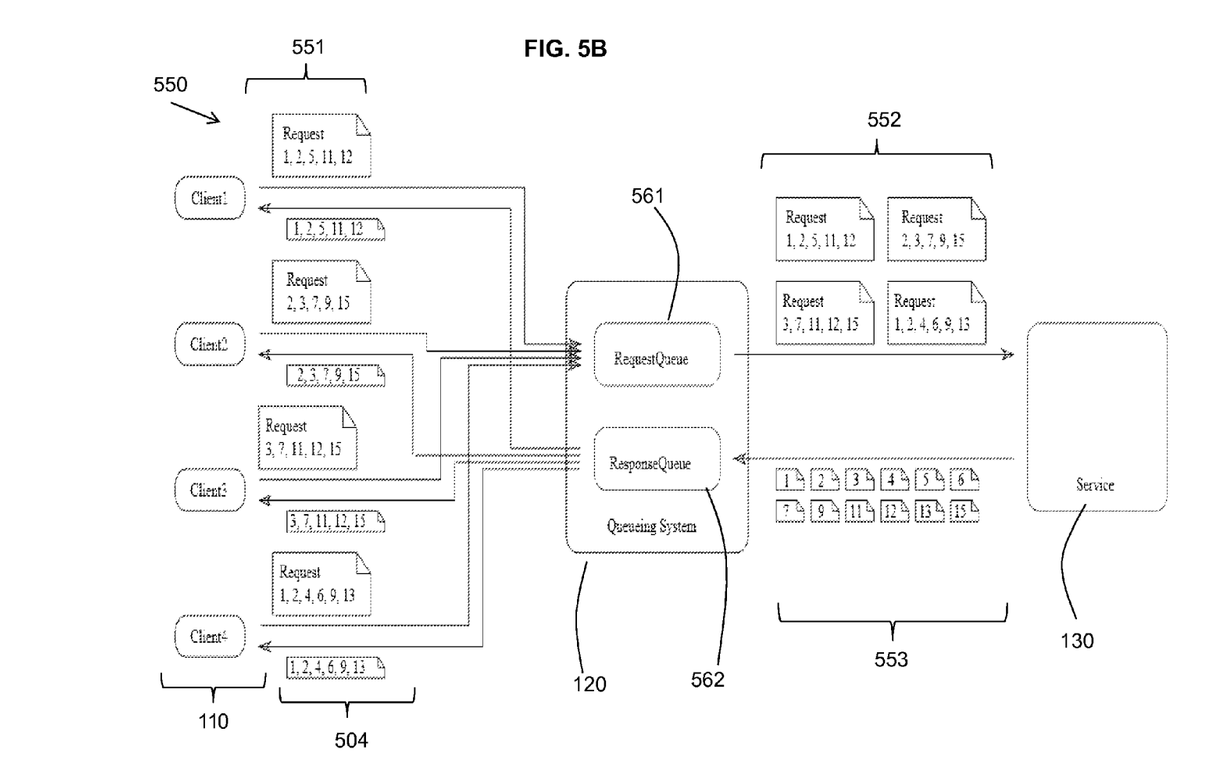
FIG. 5B is a schematic diagram showing record request processing in accordance with one or more aspects of the present invention.

Referring to FIG. 5B, a schematic diagram 550 is provided showing record request processing, in accordance with one or more aspects of the present invention. Clients 110 may send requests 551 including multiple records. The requests 551 are sent via a request queue 561 of queuing system 120 to server 130, which receives the requests 552 and processes the requests 552 according to the methods described herein, resulting in a single copy of each requested record 553 received at a given time being obtained and sent to a response queue 562 of queuing system 120. A single copy of a requested record 553 is sent at a given time when requested by multiple clients 110 in their requests 551. Clients 110 receive their requested records 554 from queuing system 120.

When a larger unit of data needs to be reconstituted from several messages, it may be desirable for the receiving application to specify the order in which the messages are received. Also, if the desired order in which the messages are to be received is known, there is no need to submit multiple GET operations to receive each individual message. The client application may just submit a single GET request specifying a list or selector that defines the set and order of the messages it wishes to receive. This eliminates the overhead of the multiple GET requests, and gives the receiving application more control over the retrieval process. This procedure appears particularly interesting in the case of XML messages, where a message may be reconstructed from sub-components, such as head, body and tail.

Those skilled in the art will note that provided herein is a method for processing messages for retrieval from a message queuing system, the method being carried out at a message sending component and comprising: receiving requests from multiple clients, wherein a request includes at least one required record; forming a union of requests, such that a common record in multiple requests is handled once; providing the common record with an associated reference count of requests requiring the record and associated metadata listing the client requests in the record; sending a record response to a queuing system when processed including the reference count and the metadata listing the client requests; determining when all records in a request have been sent; and informing a client that the request can be retrieved from the message queuing system, including a response list indicating to the client the identifier of the requested records retained at the message queuing system.

A request may include multiple records requested in a specified order.

The method may include waiting a defined period for multiple requests to be received from multiple clients in order to form a union of requests, wherein the defined period is a configurable parameter.

The method may further include: placing incoming requests on an internal queue; and removing a request from the internal queue when all the records in the request have been sent.

The method may also include: for each record in a request starting a timer if a timer is not already running for the record; and when a timer expires for a record, sending the record response to the queuing system.

On sending a record response to a queuing system, pending requests including this record may be marked to indicate that the record has been sent.

The reference count of requests for a record may include the identity of the requesting clients.

The method may include method steps carried out at a queuing system, including: receiving a record response from the sending component including the reference count and the metadata listing the client requests; and retaining a single copy of the record response in a response queue for retrieval by multiple requesting clients.

The method at the queuing system may also include: receiving a request from a client including multiple records; copying the multiple record responses from the response queue; decrementing the reference count for each record response; sending an aggregated response message to the client including the multiple records.

The method at the queuing system may further include removing a record response from a response queue when the reference count is zero.

According to one or more other aspects of the present invention, there is provided herein a system for processing messages for retrieval from a message queuing system, the system including a message sending component comprising: a request receiving component for receiving requests from multiple clients, wherein a request includes at least one required record; a union component for forming a union of requests, such that a common record in multiple requests is handled once; a record referencing component for providing the common record with an associated reference count of requests requiring the record and associated metadata listing the client requests in the record; a response component for sending a record response to a queuing system when processed including the reference count and the metadata listing the client requests; a request finalizing component for determining when all records in a request have been sent; and a client response component for informing a client that the request can be retrieved from the message queuing system, including a response list indicating to the client the identifier of the requested records retained at the message queuing system.

A request may include multiple records requested in a specified order.

The message sending component may include: a waiting component for waiting a defined period for multiple requests to be received from multiple clients in order to form a union of requests, wherein the defined period is a configurable parameter.

The message sending component may include: an internal queue for placing incoming requests; and a queue update component for removing a request from the internal queue when all the records in the request have been sent.

The message sending component may include: a timer component for starting a timer for each record in a request if a timer is not already running for the record; and a triggering component for when a timer expires for a record, sending the record response to the queuing system.

The message sending component may include: a request update component for, on sending a record response to a queuing system, marking pending requests including this record to indicate that the record has been sent.

The reference count of requests for a record may include the identity of the requesting clients.

The system may also include a queuing system comprising: a record response receiving component for receiving a record response from the sending component including the reference count and the metadata listing the client requests; and a response queue for retaining a single copy of the record response for retrieval by multiple requesting clients.

The queuing system may include: a client request receiving component for receiving a request from a client including multiple records; a record retrieving component for copying the multiple record responses from the response queue; a decrementing component for decrementing the reference count for each record response; a response sending component for sending an aggregated response message to the client including the multiple records.

The queuing system may include: a removing component for removing a record response from a response queue when the reference count is zero.

According to one or more further aspects, provided herein is a computer program stored on a computer readable medium and loadable into the internal memory of a digital computer, comprising software code portions, when said program is run on a computer, for performing the methods described herein.

Note that certain of the described aspects of the invention presented provide the advantage of allowing the receiving application to get multiple messages in arbitrary order with a single GET operation. This can be expected to yield a performance benefit as well as a reduction in application complexity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A method of facilitating processing within a computing environment, the method comprising:
   processing messages for retrieval from a message queuing system, the processing being performed at a message sending component, and comprising:
     receiving requests from multiple clients, wherein a request includes at least one required record;
     forming, on a per-record basis of the multiple requests, a union of requests received within a defined time window for the record, such that a common record of the requests is handled once;
     providing the common record with an associated reference count of requests requiring the record and associated metadata listing the client requests in the record, the providing being based on expiration of the defined time window for the common record;
     sending a record response to the message queuing system when processed, including the reference count and the metadata listing the client requests;
     determining when all records in a request have been sent; and
     sending notification to a client that the request can be retrieved from the message queuing system, including a response list indicating to the client the identifier of the requested records retained at the message queuing system.

2. The method of claim 1, wherein the request includes multiple records requested in a specified order.

3. The method of claim 1, wherein the defined time window is a defined period that is a configurable parameter.

4. The method of claim 1, further including:
   placing incoming requests on an internal queue; and
   removing the request from the internal queue when all the records in the request have been sent.

5. The method of claim 1, further including:
   for each record in the request, starting a timer if not already running for the record; and
   when the timer expires for the record, sending the record response to the queuing system.

6. The method of claim 1, wherein upon sending the record response to the queuing system, pending requests including this record are marked to indicate that the record has been sent.

7. The method of claim 1, wherein the reference count of requests for the record includes the identity of the requesting clients.

8. The method of claim 1, further including:
   receiving, at the queuing system, the record response from the sending component including the reference count and the metadata listing the client requests; and
   retaining, at the queuing system, a single copy of the record response in a response queue for retrieval by the multiple clients.

9. The method of claim 8, further including:
   receiving a request from a client of the multiple clients, the request including multiple records;
   copying the multiple record responses from the response queue;
   decrementing the reference count for each record response;
   sending an aggregated response message to the client including the multiple records.

10. The method of claim 8, further including:
    removing the record response from the response queue when the reference count is zero.

11. A system for facilitating processing within a computing environment, the system comprising:
    a memory; and
    a processor in communications with the memory, wherein the system performs a method comprising:
      processing messages for retrieval from a message queuing system, the processing being performed at a message sending component, and comprising:
        receiving requests from multiple clients, wherein a request includes at least one required record;
        forming, on a per-record basis of the multiple requests, a union of requests received within a defined time window for the record, such that a common record of the requests is handled once;
        providing the common record with an associated reference count of requests requiring the record and associated metadata listing the client requests in the record, the providing being based on expiration of the defined time window for the common record;
        sending a record response to the message queuing system when processed, including the reference count and the metadata listing the client requests;
        determining when all records in a request have been sent; and
        sending notification to a client that the request can be retrieved from the message queuing system, including a response list indicating to the client the identifier of the requested records retained at the message queuing system.

12. The system of claim 11, wherein the request includes multiple records requested in a specified order.

13. The system of claim 11, wherein
the defined time window is a defined period that is a configurable parameter.

14. The system of claim 11, wherein the system performed method includes:
placing incoming requests on an internal queue; and
removing the request from the internal queue when all the records in the request have been sent.

15. The system of claim 11, wherein the system performed method includes:
starting a timer for each record in the request if the timer is not already running for the record; and
when the timer expires for the record, sending the record response to the queuing system.

16. The system of claim 11, wherein the system performed method includes:
upon sending the record response to the queuing system, pending requests including this record are marked to indicate that the record has been sent.

17. The system of claim 11, wherein the reference count of requests for the record includes the identity of the requesting clients.

18. The system of claim 11, wherein the system performed method includes:
receiving, at the queuing system, the record response from the sending component including the reference count and the metadata listing the client requests; and
retaining, at the queuing system, a single copy of the record response in a response queue for retrieval by the multiple clients.

19. The system of claim 18, wherein the system performed method includes:
receiving a request from a client of the multiple clients, the request including multiple records;
copying the multiple record responses from the response queue;
decrementing the reference count for each record response;
sending an aggregated response message to the client including the multiple records.

20. A computer program product for facilitating processing within a computing environment, the computer program product comprising:
a computer readable storage medium having program instructions embodied therewith, the program instructions being executable by a processor to perform a method comprising:
processing messages for retrieval from a message queuing system, the processing being performed at a message sending component, and comprising:
receiving requests from multiple clients, wherein a request includes at least one required record;
forming, on a per-record basis of the multiple requests, a union of requests received within a defined time window for the record, such that a common record of the requests is handled once;
providing the common record with an associated reference count of requests requiring the record and associated metadata listing the client requests in the record, the providing being based on expiration of the defined time window for the common record;
sending a record response to the message queuing system when processed, including the reference count and the metadata listing the client requests;
determining when all records in a request have been sent; and
sending notification to a client that the request can be retrieved from the message queuing system, including a response list indicating to the client the identifier of the requested records retained at the message queuing system.

* * * * *